US008436088B2

(12) United States Patent
Cabrera et al.

(10) Patent No.: US 8,436,088 B2
(45) Date of Patent: May 7, 2013

(54) PLASTERS AND RENDERS AND PAINTS, COPOLYMER DISPERSIONS AND THEIR USE

(75) Inventors: Ivan Cabrera, Dreieich (DE); Thomas Fichtner, Dalheim (DE); Stephan Krieger, Hofheim (DE); Marc Theodorus Ratering, Liederbach (DE)

(73) Assignee: Celanese Emulsions GmbH, Kronberg/TS (DE)

( * ) Notice: Subject to any disclaimer, the term of this patent is extended or adjusted under 35 U.S.C. 154(b) by 805 days.

(21) Appl. No.: 12/444,035

(22) PCT Filed: Sep. 21, 2007

(86) PCT No.: PCT/EP2007/008245
§ 371 (c)(1),
(2), (4) Date: Dec. 22, 2009

(87) PCT Pub. No.: WO2008/040464
PCT Pub. Date: Apr. 10, 2008

(65) Prior Publication Data
US 2010/0144925 A1    Jun. 10, 2010

(30) Foreign Application Priority Data
Oct. 2, 2006    (DE) .......................... 10 2006 046 860

(51) Int. Cl.
*C09D 1/04*    (2006.01)
*C09D 157/12*   (2006.01)
*C09D 157/10*   (2006.01)

(52) U.S. Cl.
USPC ........ 524/425; 252/363.5; 427/180; 427/201; 428/32.1; 523/160; 523/161; 523/220; 524/401; 524/432; 524/442; 524/456; 524/431; 524/449; 524/502; 524/506; 524/547

(58) Field of Classification Search .............. 252/363.5; 427/180, 201; 428/32.1; 523/160, 161, 220; 524/401, 425, 432, 442, 456, 431, 444, 449, 524/502, 506, 547
See application file for complete search history.

(56) References Cited

U.S. PATENT DOCUMENTS 5,634,968 A * 6/1997 Pfaller et al. ............... 106/286.6
5,670,242 A   9/1997 Asano et al.
(Continued)

FOREIGN PATENT DOCUMENTS

DE   69528460 T2   1/2003
DE   69920872 T2   2/2006
(Continued)

OTHER PUBLICATIONS

Abstract of Japanese Patent No. JP4008773, Mar. 13, 1992, 2 pages.
(Continued)

*Primary Examiner* — Robert C Boyle
(74) *Attorney, Agent, or Firm* — Dority & Manning, P.A.

(57) ABSTRACT

Plasters and renders and paints, copolymer dispersions and their use Compositions containing selected polymer dispersions, colloidal silica, fillers and pigments are described.

Figure 1:
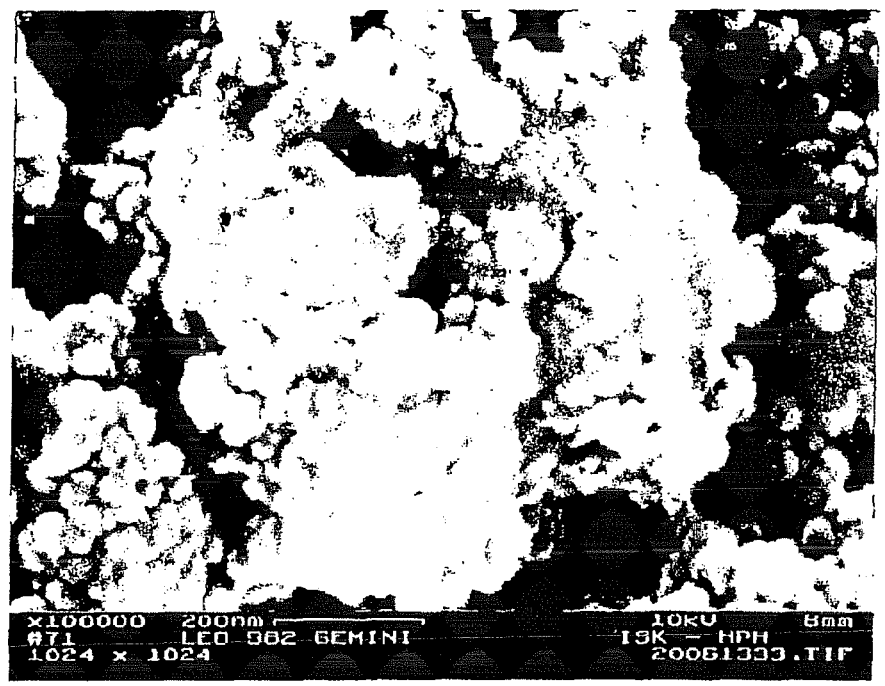

These can be formulated to give plasters and renders or paints which are distinguished by excellent abrasion resistance, little tendency to soiling, high water vapor permeability, good adhesion and good weathering stability. The compositions according to the invention can be processed to give plasters and renders or paints which have a nanostructured surface and which differ from conventionally produced surfaces.

16 Claims, 2 Drawing Sheets

U.S. PATENT DOCUMENTS

| | | | |
|---|---|---|---|
| 6,114,440 A * | 9/2000 | Yamaya et al. | 524/865 |
| 6,200,680 B1 | 3/2001 | Takeda et al. | |
| 6,387,519 B1 | 5/2002 | Anderson et al. | |
| 6,517,941 B1 | 2/2003 | Murase | |
| 6,756,437 B1 | 6/2004 | Xue et al. | |
| 2005/0124747 A1 * | 6/2005 | Murase et al. | 524/492 |

FOREIGN PATENT DOCUMENTS

| | | |
|---|---|---|
| DE | 60022765 T2 | 6/2006 |
| EP | 0565093 A1 | 10/1993 |
| EP | 0634283 A1 | 1/1995 |
| EP | 0989168 A1 | 3/2000 |
| EP | 1043372 A1 | 10/2000 |
| EP | 1384596 A1 | 1/2004 |
| EP | 1470928 A1 | 10/2004 |
| JP | 55054358 | 4/1980 |
| JP | 59071316 | 4/1984 |
| JP | 60219265 | 11/1985 |
| JP | 61047766 | 3/1986 |
| JP | 62127365 | 6/1987 |
| JP | 2117977 | 5/1990 |
| JP | 7157709 | 6/1995 |
| JP | 9031297 | 2/1997 |
| JP | 11181210 | 7/1999 |
| JP | 2005023189 | 1/2005 |
| WO | WO 0023533 A1 | 4/2000 |
| WO | WO 0118081 A1 | 3/2001 |

OTHER PUBLICATIONS

Abstract of Japanese Patent No. JP57025371, Mar. 10, 1982, 2 pages.
Search Report for PCT/EP2007/008245 dated Dec. 19, 2007, 4 pages.
International Preliminary Report of Patentability with Written Opinion (Translation) dated May 5, 2009, 7 pages.

* cited by examiner

PLASTERS AND RENDERS AND PAINTS, COPOLYMER DISPERSIONS AND THEIR USE

The present invention relates to novel compositions which contain selected polymer dispersions and colloidal silica and the use of these compositions in plasters and renders or paints.

The use of aqueous polymer dispersions as binders in plasters and renders or paints is known to the person skilled in the art.

Aqueous compositions containing polymer dispersions and colloidal silica have also already been described frequently and for a very wide range of applications.

WO-A-00/23,533 describes coating compositions containing a hydrosol emulsion and colloidal silica. The hydrosol emulsion is prepared by neutralization of a synthetic resin emulsion with alkali, said synthetic resin emulsion forming as the result of dispersion of particles of synthetic resins containing carboxyl and alkoxysilyl groups in water. Coating compositions for the production of coated papers are disclosed, but not plaster and render or paint formulations. For carrying out the neutralization, these known synthetic resin emulsions must contain comparatively high proportions of acidic monomers incorporated in the form of polymerized units. When used as binders, these plastics emulsions will impart poor water resistance to the plaster and render or paint formulations, owing to their alkali solubility or alkali swellability.

Thus, EP-A-1,384,596 discloses a coating composition for inkjet printing. This contains colloidal silica and a polymer dispersion which are prepared by emulsion polymerization of a monomer capable of free radical polymerization and containing a silyl group and a further monomer copolymerizable therewith, in the presence of a surfactant. The polymer dispersion must have at least two glass transition temperatures. This can be brought about by mixing different polymers having different glass transition temperatures or by multistage polymerization with different compositions of monomers. According to the working examples, colloidal silica is added to the polymer dispersion after the emulsion polymerization. The compositions obtained are outstandingly suitable for inkjet printing and are distinguished not only by good performance characteristics but also by increased gloss and weathering resistance of the imprinted substrates. The coating composition contains no fillers.

JP-A-2005-023,189 describes aqueous coating compositions from which it is possible to formulate paints which are distinguished by good water resistance, weathering resistance and resistance to organic bases. The compositions contain polymer dispersions which are prepared by emulsion polymerization and are derived from (meth)acrylates and from ethylenically unsaturated carboxylic acid and optionally further monomers copolymerizable therewith. After the emulsion polymerization, alkoxysilanes which react with the emulsion polymer are added to the polymer dispersion. Colloidal silica is then added. The coating composition contains no fillers and the polymer dispersion contains no emulsifier incorporated in the form of polymerized units.

JP-A-59-071,316 discloses a water-dispersible composition which is used as an antifouling paint. During the emulsion polymerization of (meth)acrylates or vinylaromatics and copolymerizable silane monomers, colloidal silica is added. The polymer dispersion contains no emulsifier incorporated in the form of polymerized units.

JP-A-62-127,365 discloses a paint formulation which can be used in the interior and exterior area and whose films are distinguished by outstanding permeability to moisture and by high gloss. The formulation contains an acrylate polymer which is emulsified together with colloidal silica. The preparation of the dispersion is not effected by emulsion polymerization.

JP-A-61-047,766 describes an additive for a material for interior use. This contains a colloidal silica in addition to a polyacrylate dispersion. The acrylate polymer has a low film formation temperature. There is no indication of copolymers having alkoxysilyl groups.

JP-A-55-054,358 describes coatings for the surface treatment of light concrete parts. In addition to an acrylic resin dispersion, colloidal silica, pigments and polyolefin glycol, the compositions contain calcium bicarbonate having a selected particle diameter. There is no indication of copolymers having alkoxysilyl groups.

JP-A-57-025,371 describes a composition for the treatment of building materials. This is prepared by mixing an aqueous resin or rubber suspension with colloidal silica. There is no indication of copolymers having alkoxysilyl groups.

JP-A-60-219,265 discloses a process for the treatment of metal surfaces. An acrylate dispersion which contains alkoxysilane groups and has been prepared by emulsion polymerization in the presence of colloidal silica is used. The polymer dispersion contains no emulsifier incorporated in the form of polymerized units.

JP-A-02-117,977 describes a coating composition for building materials. In addition to a first non-film-forming dispersion containing silane groups, a second film-forming dispersion is used. The polymer of the first dispersion has alkoxysilyl groups which bind colloidal silica. There is no indication of the use of fillers.

JP-A-04-008,773 describes an antifouling paint. This is prepared by polymerization of acrylates having alkoxysilane groups in the presence of colloidal silica. The polymer dispersion contains no emulsifier incorporated in the form of polymerized units.

JP-A-07-157,709 describes an aqueous coating composition for a very wide range of inorganic substrates. Coatings having high water resistance and resistance to chemicals form. The composition is prepared by subjecting monomers capable of free radical polymerization to emulsion polymerization with copolymerizable alkoxysilanes. A very finely divided copolymer having particle diameters of less than 100 nm forms, to which colloidal silica is added. The polymer dispersion contains no emulsifier incorporated in the form of polymerized units.

JP-A-09-031,297 discloses a water-dispersible composition which contains core-shell polymers and is distinguished by good water resistance of the films formed therefrom. The composition may contain colloidal silica. The shell of the polymer particles is derived from (meth)acrylates which contain copolymerizable alkoxysilane groups. The core of the polymer particles is derived from vinylaromatic monomers and optionally from (meth)acrylates.

JP-A-11-181,210 discloses a storage-stable and curable composition. This is obtained by addition of colloidal metal oxides which are not colloidal silica gel to an aqueous dispersion of a (meth)acrylate copolymer which contains alkoxysilane groups and has been prepared by microsuspension polymerization.

EP-A-989,168 describes an aqueous coating composition. This is derived from a selected aqueous polymer dispersion which has been mixed with a selected amount of colloidal silica. The polymer is prepared by solution polymerization and then dispersed in water.

Although the use of compositions containing colloidal silica in the building sector is described in some of these documents, there is still a need for an improvement of these products.

It has now surprisingly been found that selected polymer dispersions containing colloidal silica and selected additives can be formulated to give plasters and renders or paints which are distinguished by excellent abrasion resistance, little tendency to soiling, high water vapor permeability, good adhesion and good weathering stability. The compositions according to the invention can be processed to give plasters and renders or paints which have a nanostructured surface and which differ from conventionally produced surfaces.

It is therefore an object of the present invention to provide formulations which can be used as interior and in particular exterior plasters and renders or paints and which have the abovementioned advantageous properties.

In a first embodiment, the invention relates to a composition containing
- a) mineral filler, the proportion of particles having a diameter of at least 40 μm being at least 40% by weight,
- b) pigment,
- c) colloidal silica and
- d) aqueous plastics dispersion which contains a copolymer which is prepared by emulsion polymerization and is derived from
  - A) at least 40% by weight, based on the total amount of monomer, of esters of α,β-unsaturated carboxylic acids, vinyl esters of saturated carboxylic acids, vinylaromatic monomers or combinations of two or more of these monomers,
  - B) from 0.1 to 10% by weight, based on the total amount of monomers, of α,β-ethylenically unsaturated mono- and/or dicarboxylic acids and/or of α,β-ethylenically unsaturated sulfonic acids and/or of α,β-ethylenically unsaturated phosphoric acids and/or of α,β-ethylenically unsaturated phosphonic acids and/or of amides of α,β-ethylenically unsaturated mono- and/or dicarboxylic acids,
  - C) from 0.5 to 15% by weight, based on the total amount of monomers, of ethylenically unsaturated monomers which have at least one alkoxysilyl group,
  - D) from 0.1 to 10% by weight, based on the total amount of monomers, of an ethylenically unsaturated surface-active monomer containing at least one anionic and/or nonionic emulsifying group and
  - E) optionally up to 20% by weight, based on the total amount of monomers, of other monomers copolymerizable with the monomers of groups A), B), C) and D), with the proviso that,
  - instead of or in addition to the copolymerization of the monomer C), from 0.5 to 15% by weight, based on the total amount of monomers, of a monomer which has at least one amino, mercapto or epoxide group in addition to at least one alkoxysilyl group is added after the emulsion polymerization.

In this first embodiment of the compositions according to the invention which are used mainly as plasters and renders, the formulations contain, in addition to the components b), c) and d), mineral fillers a) having a high proportion of coarse particles. In this embodiment, the mineral filler a) typically contains a proportion of at least 40% by weight of particles having a diameter of at least 40 μm.

In this embodiment, component a) is typically present in an amount of from 50 to 80% by weight, based on the total formulation.

In a second embodiment, the invention relates to a composition containing
- a) mineral filler, the mean diameter of the particles being from 1 to 40 μm, and
- the above-defined components b), c) and d).

In this second embodiment of the compositions according to the invention which are used mainly as paints, the formulations contain, in addition to the components b), c) and d), mineral fillers a) without coarse particle fractions. Typically, the mean diameter of the particles (determined by sedimentation analysis according to DIN 66115) of the mineral filler a) in this embodiment is from 1 to 40 μm.

In this embodiment, component a) is typically present in an amount of from 20 to 60% by weight, based on the total formulation.

The pigments and fillers known per se for use in coating compositions are used as components a) and b). These are inorganic and/or organic solids which are preferably used as powders. In the context of this description, pigments are understood as meaning solids which have a refractive index greater than or equal to 1.75. In the context of this description, fillers are understood as meaning solids which have a refractive index of less than 1.75.

Examples of mineral fillers are alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions.

Component b) may be any inorganic or organic pigments. Color-imparting and opaque finely divided solids are used as component b). Examples of these are mentioned further below.

Preferred pigments have a mean diameter for the primary particle of less than or equal to 1 μm, preferably from 0.1 to 0.5 μm, determined by sedimentation analysis according to DIN 66115.

Examples of inorganic pigments are metal oxides, such as titanium dioxide, iron oxide or zinc oxide, in particular titanium dioxide.

Examples of organic pigments are phthalocyanines, in particular phthalocyanine blue, or diaryl pigments, azo pigments or quinacridone pigments.

In the first embodiment of the invention (plasters and renders), component b) is typically present in an amount of from 1 to 25% by weight, based on the total formulation, in particular in an amount of from 2 to 15% by weight.

In the second embodiment of the invention (paints), component b) is typically present in an amount of from 1 to 50% by weight, based on the total formulation, in particular in an amount of from 2 to 20% by weight.

Component c) may be any colloidal silicas. Colloidal silica suitable for the present invention is preferably an aqueous colloidal dispersion or suspension of ultrafine silica particles. The particle diameter of primary particles in this dispersion or suspension is preferably from 2 to 100 nm and the primary particles are spherical.

The colloidal silica c) used according to the invention is preferably an amorphous silica and is either of the anionic or of the cationic type (=anionic or cationic surface charges of the particles, which can be compensated by corresponding counterions). Dispersions in which the particles are stabilized by anionic surface charges and contain alkali metal or ammonium counterions, in particular sodium, potassium or ammonium counterions, are preferably used. Furthermore, the colloidal silica may be a monodisperse or a polydisperse silica. Colloidal silica is commercially available, for example under the trade name Klebosol®, Köstrosol® or Levasil®.

The colloidal silica is typically used in an amount of from 5 to 200 parts by weight, based on the amount of copolymer. If the colloidal silica is used in an amount of 5 parts by weight or in a larger amount, the plaster and render or paint containing this plastics dispersion has the advantageous properties described above.

If the colloidal silica is used in an amount of 200 parts by weight or in a smaller amount, the plaster and render according to the invention or the paint has good film-forming properties and is therefore suitable for use in the construction sector.

Component c) may be added in the emulsion polymerization itself during the preparation of the aqueous polymer dispersion d). However, this embodiment is less preferred. Usually, component c) is added to the aqueous polymer dispersion after the preparation thereof and/or during the preparation of the plaster and render or paint formulation. Addition of the colloidal silica after the preparation of the polymer dispersion is particularly preferred.

In the case of the modification of the aqueous polymer dispersion d) by subsequent addition of colloidal silica c), it has surprisingly been found that the compositions obtained differ substantially compared with the formulations in which the colloidal silica is already present during the emulsion polymerization, namely through lower proportions of coagulum, increased storage stability and the possibility of establishing higher solids contents.

Preferred compositions additionally contain water-soluble silicate e) and/or silicone resin f), apart from the components a) to d).

All materials known per se to the person skilled in the art can be used as water-soluble silicates e). Examples of these are water-soluble alkali metal waterglass, in particular sodium or potassium waterglass.

Likewise, all materials known per se to the person skilled in the art can be used as silicone resins f). Examples of these are poly(dialkylsiloxanes), in particular poly(dimethylsiloxanes). These may be crosslinking or noncrosslinking systems.

Component e) is typically present in an amount of from 0 to 40% by weight, based on the total formulation, in particular in an amount of from 10 to 30% by weight.

Component f) is typically present in an amount of from 0 to 10% by weight, based on the total formulation, in particular in an amount of from 4 to 8% by weight.

The plastics dispersion d) used according to the invention is prepared by emulsion polymerization in a manner known per se. Aqueous dispersions of synthetic resin particles also have alkoxysilyl groups in addition to carboxyl groups and/or sulfo groups and/or phosphoric acid groups and/or phosphonic acid groups.

According to the invention, the plastics dispersion d) can be prepared by emulsion polymerization of at least one monomer of group A), preferably an ester of acrylic acid, of methacrylic acid, of crotonic acid, of maleic acid, of itaconic acid, of citraconic acid and of fumaric acid, with at least one monomer of group B), preferably one ethylenically unsaturated carboxylic acid, with at least one monomer of group C), preferably one organoalkoxysilane having an unsaturated bond capable of free radical polymerization, and with at least one monomer of group D). Alternatively, the plastics dispersion can also be obtained by emulsion polymerization of at least one monomer of group A) with at least one monomer of group B) and of group D) and by mixing of the resulting copolymer with an organoalkoxysilane which contains at least one amino, mercapto or epoxide group instead of an unsaturated bond capable of free radical polymerization.

Carrying out an emulsion polymerization by these methods leads to the production of a plastics dispersion in which the plastics particles, which contain a carboxyl group, an alkoxysilyl group and emulsifying group, are dispersed in water.

The choice of the monomer combinations used is effected so that the glass transition temperature(s) desired for the intended use are obtained. The selection criteria for this are known to the person skilled in the art.

Usually, copolymers whose glass transition temperatures are in the range from $-50$ to $+50°$ C., preferably $-30$ to $+30°$ C., are prepared.

The glass transition temperatures are determined for the purposes of the present description by means of differential scanning calorimetry (DSC) according to DIN 53765. For this purpose, the sample is dried at 130° C. for 1 hour, cooled and then heated. This is effected at a heating rate of 10 K/minute.

According to the invention, the monomer of group A), namely a (meth)acrylate, a vinyl ester of a saturated carboxylic acid and/or a vinylaromatic monomer, forms the skeleton of the plastic which is used for the preparation of the plastics dispersion described above.

Preferred monomers of group A) are alkyl(meth)acrylates (i.e. alkyl esters of acrylic acid or of methacrylic acid). Examples of these are methyl acrylate, ethyl acrylate, propyl acrylate, butyl acrylate, 2-ethylhexyl acrylate, methyl methacrylate, ethyl methacrylate, propyl methacrylate, n-butyl methacrylate, tert-butyl methacrylate, isobutyl methacrylate, 2-ethylhexyl methacrylate, cyclohexyl methacrylate and cyclohexyl acrylate. These alkyl esters can be used alone or in the form of a combination of two or more esters.

In addition or instead, alkyl(meth)acrylates containing hydroxyl groups or containing epoxide groups can be used. If an alkyl(meth)acrylate containing hydroxyl groups or containing epoxide groups is used as the alkyl(meth)acrylate, the plastics dispersion prepared therewith also contains a hydroxyl group or an epoxide group in addition to the carboxyl and alkoxysilyl group.

The examples of alkyl(meth)acrylates containing hydroxyl groups includes hydroxymethyl methacrylate, hydroxyethyl acrylate, hydroxypropyl methacrylate, hydroxypropyl acrylate, hydroxybutyl methacrylate and hydroxybutyl acrylate. These alkyl esters can be used alone or in the form of a combination of two or more esters.

The examples of alkyl(meth)acrylates containing epoxide groups include glycidyl methacrylate or glycidyl acrylate.

In addition to or instead of the (meth)acrylates, it is possible to use vinyl esters of saturated carboxylic acids as main monomers. These are as a rule vinyl esters of saturated carboxylic acids having 1 to 18 carbon atoms.

Examples of these are vinyl esters of carboxylic acids having 1 to 4 carbon atoms, such as, for example, vinyl formate, vinyl acetate, vinyl propionate, vinyl isobutyrate, vinyl pivalate and vinyl 2-ethylhexanoate; or vinyl esters of saturated, branched monocarboxylic acids having 9, 10 or 11 carbon atoms in the acid radical (®Versaticsäuren); or vinyl esters of relatively long-chain, saturated and unsaturated fatty acids, for example vinyl esters of fatty acids having 8 to 18 carbon atoms, such as, for example, vinyl laurate and vinyl stearate; or vinyl esters of benzoic acid or of p-tert-butylbenzoic acid and mixtures thereof, such as, for example, mixtures of vinyl acetate and a versatic acid or of vinyl acetate and vinyl laurate. Vinyl acetate is particularly preferred. In addition to or instead of the (meth)acrylates and/or of the vinyl esters, vinylaromatic hydrocarbons can be used as main monomers. Examples of these are styrene, vinyltoluene and alpha-methylstyrene.

In addition to these main monomers, monomers of group B), namely carboxylic acids capable of free radical polymerization, amides thereof, sulfonic acids, phosphoric acids, phosphonic acids and mixtures thereof are used for the preparation of the plastics dispersion.

Carboxylic acids, sulfonic acids, phosphoric acids, phosphonic acids and mixtures thereof capable of free radical polymerization are preferably used as monomers of group B).

The monomers of group B) include those compounds which carry at least one carboxyl, carboxamide, sulfo, phosphoric acid or phosphonic acid group in the direct neighborhood of the double bond unit or linked thereto via a spacer. Ethylenically unsaturated $C_3$-$C_8$-monocarboxylic acids, ethylenically unsaturated $C_4$-$C_8$-dicarboxylic acids and anhydrides or amides thereof and monoesters of ethylenically unsaturated $C_4$-$C_8$-dicarboxylic acids being mentioned as examples. Usually, the monomers of group B) have up to eight carbon atoms, in particular from 3 to 8 carbon atoms.

Ethylenically unsaturated $C_3$-$C_8$-monocarboxylic acids, such as acrylic acid, methacrylic acid and crotonic acid, and the anhydrides and amides thereof; ethylenically unsaturated $C_4$-$C_8$-dicarboxylic acids, such as maleic acid, fumaric acid, itaconic acid and citraconic acid, and the mono- or bisamides thereof and monoesters with $C_1$-$C_{12}$-alkanols, preferably $C_1$-$C_4$-alkanols, such as, for example, monomethyl maleate and mono-n-butyl maleate, are preferred. Further preferred, ethylenically unsaturated, ionic monomers are ethylenically unsaturated sulfonic acids, in particular ethylenically unsaturated sulfonic acids having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid, vinylbenzenesulfonic acid, and ethylenically unsaturated phosphoric acids having 2-8 carbon atoms, such as vinylphosphonic acid.

In addition to or instead of said acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Further examples of monomers of group B) are amides of ethylenically unsaturated carboxylic acids, in particular methacrylamide, acrylamide, crotonamide, the mono- or diamide of fumaric acid, the mono- or diamide of maleic acid, the mono- or diamide of itaconic acid and the mono- or diamide of citraconic acid. In addition to the amides, it is also possible to use the N-functionalized derivatives thereof, such as N-alkyl- or N,N-dialkylamides. The unfunctionalized derivatives are preferred.

In addition to the main monomers of group A) and the monomers of group B), monomers of group C), namely ethylenically unsaturated monomers which have at least one alkoxysilyl group, are preferably used for the preparation of the plastics dispersion. Instead of monomers of group C) or in addition to monomers of group C), a monomer which has at least one amino, mercapto or epoxide group in addition to at least one alkoxysilyl group can be added to the copolymer after the emulsion polymerization.

Examples of organoalkoxysilanes are compounds having an ethylenically unsaturated bond, i.e. having an unsaturated bond capable of free radical polymerization, which compounds have at least one alkoxysilane group.

These are compounds which are incorporated into the copolymer during the polymerization; however, it is also possible to use organoalkoxysilanes, which are present in the dispersion alongside the polymer as a separate component.

The organoalkoxysilanes which can be used according to the invention preferably include compounds of the formula I or II a) an organofunctional silane

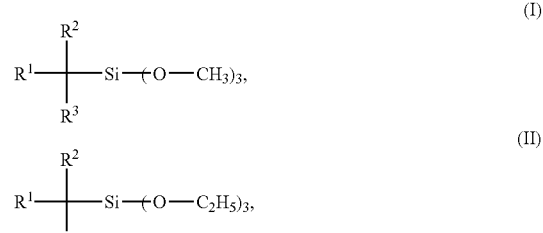

in which $R^1$ is $-(CH_2)_n-NH-R^4$, $-(CH_2)_n-NH-[(CH_2)_m-NH]_o-R^4$ or $-(CH_2)_n-O-R^5$, $-(CH_2)_n-CH=CH_2$ or $-(CH_2)_n-S-R^5$, $R^2$ is hydrogen, $-(CH_2)_n-CH_3$ or $R^1$, $R^3$ is hydrogen, $-(CH_2)_n-CH_3$ or $R^2$, $R^4$ is hydrogen, $-(CH_2)_n-CH_3$ or $-CO-(CH_2)_m-CH_3$, and $R^5$ is hydrogen, $-(CH_2-CH_2-O)_m-R^4$ or

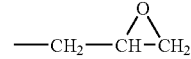

in which n and m, in each case independently of one another, are an integer between 0 and 12 and o is an integer between 0 and 5.

Further preferably used silanes are polyfunctional silanes. These include in particular compounds which, in addition to at least one silane group, have at least one primary, secondary or tertiary amino group, at least one alkylthio group or sulfhydryl group or at least one epoxide group.

Particularly preferred compounds from this group are compounds of the formulae III, IV, V, VI, VII or VIII

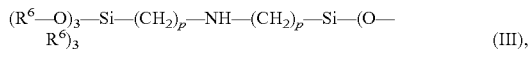

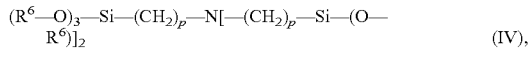

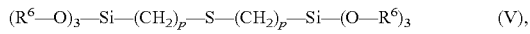

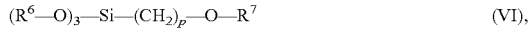

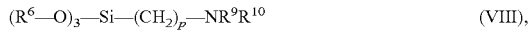

in which $R^6$, independently of one another, are hydrogen or $C_1$-$C_6$-alkyl, preferably methyl, ethyl or propyl, $R^7$ is hydrogen, $C_1$-$C_6$-alkyl or a glycidyl radical (1,2-epoxypropyl), $R^8$ is hydrogen or $C_1$-$C_6$-alkyl, $R^9$ and $R^{10}$, independently of one another, are hydrogen or $C_1$-$C_6$-alkyl and p is an integer between 1 and 12.

Particularly preferred silanes of the formulae III, IV and V are the compounds:

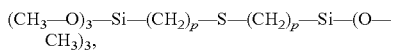

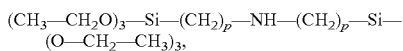

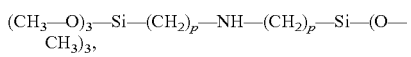

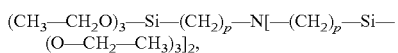

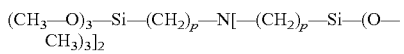

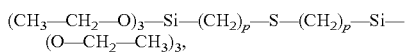

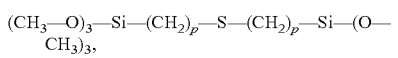

in which p has the above-defined meaning.

Further preferably used silanes are di-, tri- or oligomeric silanes.

The silanes can be used as individual compounds or as mixtures.

The following may be mentioned as examples of silane compounds of the abovementioned type, which are commercially available:

Silanes of the trade name Dynasylan® (Degussa), of the trade name Geniosil® (Wacker) or of the trade name Silquest® (GE Silicones).

Organosilanes which are incorporated into the polymer include ethylenically unsaturated and alkoxysilane group-containing monomers of the formula $R^{11}Si(CH_3)_{0-2}(OR^{12})_{3-1}$, in which $R^{11}$ has the meaning $CH_2=CR^{13}-(CH_2)_{0-1}$ or $CH_2=CR^{13}CO_2-(CH_2)_{1-3}$, $R^{12}$ is a straight-chain or branched, optionally substituted alkyl radical having 1 to 12 carbon atoms, which may be optionally interrupted by an ether group, and $R^{13}$ is hydrogen or methyl.

Silanes of the formulae $CH_2=CR^{13}-(CH_2)_{0-1}Si(CH_3)_{0-1}(OR^{12})_{3-2}$ and $CH_2=CR^9CO_2-(CH_2)_3Si(CH_3)_{0-1}(OR^8)_{3-2}$, in which $R^{12}$ is a straight-chain or branched, optionally substituted alkyl radical having 1 to 12 carbon atoms and $R^{13}$ is hydrogen or methyl, are preferred.

Particularly preferred silanes are vinylmethyldimethoxysilane, vinylmethyldiethoxysilane, vinylmethyldi-n-propoxysilane, vinylmethyldiisopropoxysilane, vinylmethyldi-n-butoxysilane, vinylmethyldi-sec-butoxysilane, vinylmethyldi-tert-butoxysilane, vinylmethyldi(2-methoxyisopropoxy)silane and vinylmethyldioctyloxysilane.

Particularly preferred are silanes of the formulae $CH_2=CR^{13}-(CH_2)_{0-1}Si(OR^{14})_3$ and $CH_2=CR^2CO_2-(CH_2)_3Si(OR^1)_3$, in which $R^{14}$ is a branched or straight-chain alkyl radical having 1 to 4 carbon atoms and $R^{13}$ is hydrogen or methyl.

Examples of these are γ-(meth)acryloyloxypropyltris(2-methoxyethoxy)-silane, γ-(meth)acryloyloxypropyltrismethoxysilane, γ-(meth)acryloyloxypropyltrisethoxysilane, γ-(meth)acryloyloxypropyltris-n-propoxysilane, γ-(meth)acryloyloxypropyltrisisopropoxysilane, γ-(meth)acryloyloxypropyltrisbutoxysilane, γ-acryloyloxypropyltris(2-methoxyethoxy)silane, γ-acryloyloxypropyltrismethoxysilane, γ-acryloyloxypropyltrisethoxysilane, γ-acryloyloxypropyltris-n-propoxysilane, γ-acryloyloxypropyltrisisopropoxysilane, γ-acryloyloxypropyltrisbutoxysilane and vinyltris(2-methoxyethoxy)-silane, vinyltrismethoxysilane, vinyltrisethoxysilane, vinyltris-n-propoxysilane, vinyltrisisopropoxysilane and vinyltrisbutoxysilane. Said silane compounds can optionally also be used in the form of their (partial) hydrolysis products.

Particularly preferably used silanes are primary and secondary aminoalkylethoxysilanes, bis(3-triethoxysilylpropyl) amine, trifunctional propyltrimethoxysilane $[NH_2-(CH_2)_2-NH-(CH_2)_2-NH-(CH_2)_3-Si(OCH_3)_3]$, vinyltriethoxysilane $[CH_2=CH-Si(OC_2H_5)_3]$, vinyltrimethoxysilane $[CH_2=CH-Si(OCH_3)_3]$, 3-glycidyloxypropyltriethoxysilane, 3-mercaptopropyltrimethoxysilane, 3-aminopropyltrimethoxysilane, oligomeric diaminosilane system, glycidyltrimethoxy-functional silane, vinyltriethoxy-functional silane, glycidyltriethoxy-functional silane, vinyltris(2-methoxyethoxy)silane, (3-glycidyloxypropyl)trimethoxysilane, N-(2-aminoethyl)(3-aminopropyl)trimethoxysilane, (3-aminopropyl)triethoxysilane, N-(2-aminoethyl)(3-aminopropyl)methyldimethoxysilane, (3-aminopropyl)trimethoxysilane, (methacryloyloxymethyl)methyldimethoxysilane, (methacryloyloxymethyl)-trimethoxysilane and/or (methacryloyloxymethyl)methyldiethoxysilane.

In addition to the main monomers of group A) and the monomers of group B) and the monomers of group C), monomers of group D), namely ethylenically unsaturated surface-active monomers which contain at least one anionic and/or nonionic group, are used for the preparation of the plastics dispersion.

These emulsifiers are surfactants which may be incorporated into the copolymer during the emulsion polymerization. Usually, the monomers of group D) have more than eight carbon atoms.

The monomers of group D) have at least one hydrophilic group, it being possible for the hydrophilic group to be nonionic, for example a polyglycol group, or to be anionic, for example a sulfate, sulfonate, phosphate or phosphonate group. The monomers of group D) preferably additionally have at least one hydrophobic group, it being possible for the hydrophobic group to be, for example, an alkyl, cycloalkyl, alkenyl, aryl or acyl group, and possess at least 9 carbon atoms.

The monomers of group D) preferably have a vinyl group, an allyl group or a radical of an ethylenically unsaturated acid, such as an acrylic acid, methacrylic acid, crotonic acid, itaconic acid or maleic acid radical, and have at least 9 carbon atoms.

The monomers of group D) preferably have from one to three nonionic or in particular anionic emulsifying groups. Particularly preferred emulsifying groups are polyalkylene glycol groups which in particular are anionically functionalized, for example with a sulfate or sulfo group.

Particularly preferred monomers are compounds of the formulae X, XI, XII, XIII, XIV, XV, XVI, XVII, XVIII, XIX, XX, XXI, XXII, XXIII, XXIV, XXV, XXVI, XXVII, XXVIII, XXIX, XXX, XXXI, XXXII and XXXIII

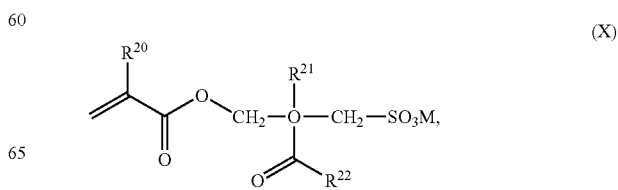

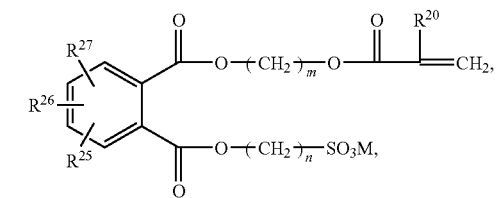  (XI)
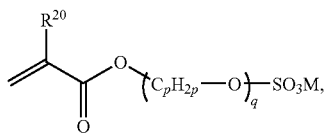  (XII)
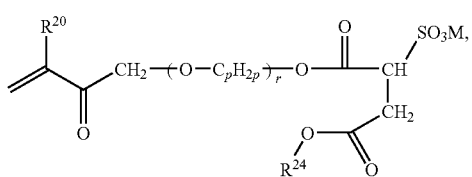  (XIII)
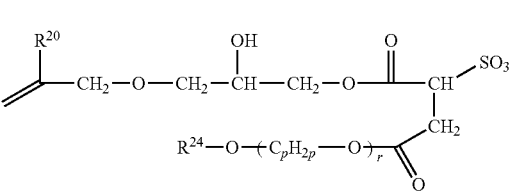  (XIV)
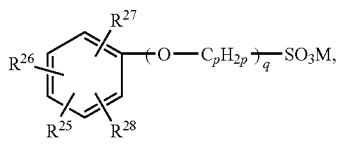  (XV)
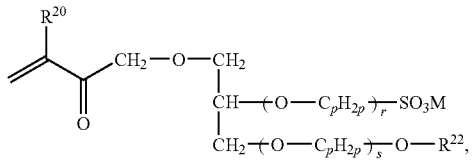  (XVI)
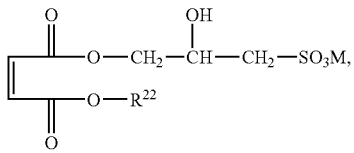  (XVII)
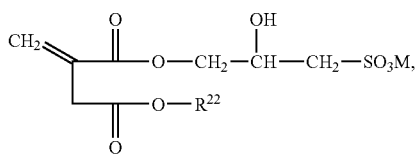  (XVIII)
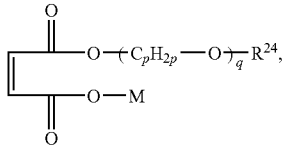  (XIX)
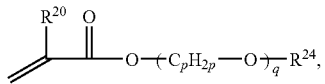  (XX)
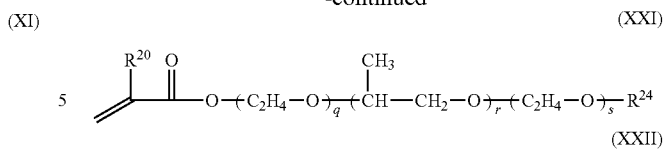  (XXI)
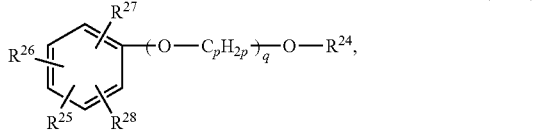  (XXII)
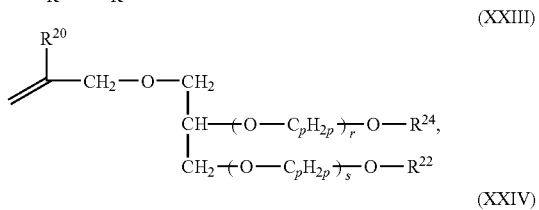  (XXIII)
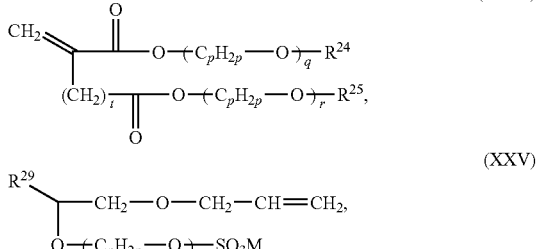  (XXIV)
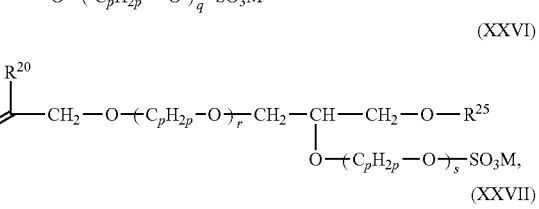  (XXV)
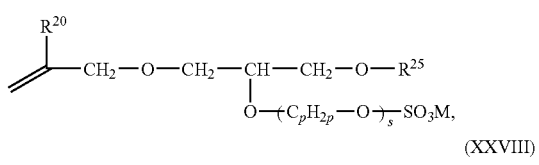  (XXVI)
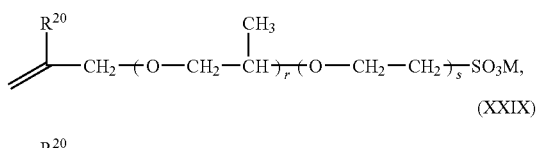  (XXVII)
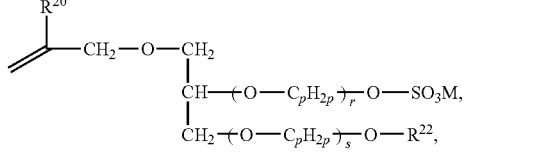  (XXVIII)
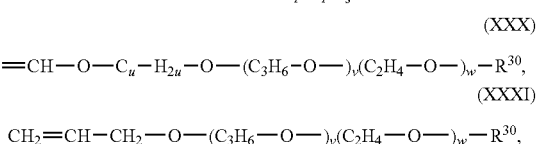  (XXIX)
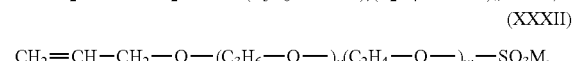  (XXX)
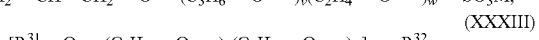  (XXXI)
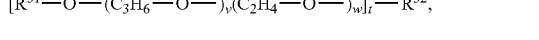  (XXXII)
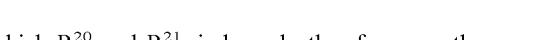  (XXXIII)
in which $R^{20}$ and $R^{21}$, independently of one another, are hydrogen or $C_1$-$C_4$-alkyl, preferably hydrogen or methyl, $R^{22}$ is $C_6$-$C_{30}$-alkyl, $C_6$-$C_{30}$-alkenyl or $C_7$-$C_{30}$-alkylaryl, preferably $C_8$-$C_{24}$-alkyl, M is an alkali metal cation, an ammonium ion or hydrogen, preferably a sodium ion or an ammonium ion, $R^{25}$, $R^{26}$ and $R^{27}$, independently of one another, are hydrogen, $C_1$-$C_{30}$-alkyl, $C_2$-$C_{30}$-alkenyl, cycloalkyl, aryl or acyl, preferably hydrogen, $C_1$-$C_{24}$-alkyl or $C_2$-$C_4$-alkenyl, n and m, independently of one another, are integers from 1 to 4, preferably 2, p is an integer from 2 to 4, preferably 2, q is an integer from 1 to 100, preferably from 4 to 20, $R^{24}$ is hydrogen, $C_1$-$C_{30}$-alkyl, $C_2$-$C_{30}$-alkenyl, cycloalkyl, aryl or acyl, preferably $C_1$-$C_{18}$-alkyl, r is an integer from 0 to 100, preferably from 2 to 20, $R^{28}$ is $C_2$-$C_4$-alkenyl, preferably vinyl, allyl or methylvinyl, s is an integer from 0 to 100, preferably from 2 to 20, t is 1 or 2, $R^{29}$ is $C_1$-$C_{30}$-alkyl, preferably $C_1$-$C_4$-alkyl, u is an integer from 1 to 20, preferably from 2 to 10, v and w, independently of one another, are integers from 0 to 100, preferably from 2 to 20, at least one of the numbers v or w not being equal to zero, $R^{30}$ is hydrogen or $C_1$-$C_4$-alkyl, preferably hydrogen or methyl, $R^{31}$ is an alkenyl radical or a carboxyalkenyl radical having 6 to 30 carbon atoms and $R^{32}$ is hydrogen, $C_1$-$C_4$-alkyl or a radical of the formula $PO_{4-t}M_{3-t}$.

Very particularly preferably used among these compounds listed above are those which have at least 9 carbon atoms.

A very particularly preferably used monomer of group D) is a compound of the formula XVa

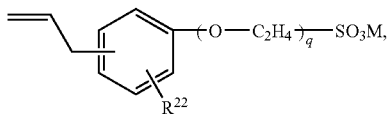

in which q, $R^{22}$ and M have the above-defined meanings.

In addition to the main monomers of group A), the monomers of group B), the monomers of group D) and optionally the monomers C), monomers of group E), namely other monomers capable of free radical polymerization, which differ from the monomers of groups A) to D), can be used for the preparation of the plastics dispersion.

These may be very different groups of monomers.

The monomers of group E) include, for example, ethylenically unsaturated, nonionic functional monomers, such as water-soluble N-vinyllactams, such as, for example, N-vinylpyrrolidone.

Furthermore, nitriles of ethylenically unsaturated $C_3$-$C_8$-carboxylic acids, such as acrylonitrile and methacrylonitrile, and adhesion-improving and crosslinking monomers are suitable as ethylenically unsaturated, nonionic functional monomers. Conjugated $C_4$-$C_8$-dienes, such as 1,3-butadiene, isoprene and chloroprene, or aliphatic ethylenically unsaturated, optionally halogen-substituted hydrocarbons, such as ethylene, propylene, butylene, vinyl chloride or vinylidene chloride, can also be used as monomers.

The adhesion-improving monomers include both compounds which have an acetoacetoxy unit covalently bonded to the double bond system and compounds having covalently bonded urea groups. The first-mentioned compounds include in particular acetoacetoxyethyl(meth)acrylate and allyl acetoacetate. The compounds containing urea groups include, for example, N-vinyl- and N-allylurea and derivatives of imidazolidin-2-one, such as N-vinyl- and N-allylimidazolidin-2-one, N-vinyloxyethylimidazolidin-2-one, N-(2-(meth)acrylamidoethyl)imidazolidin-2-one, N-(2-(meth)acryloyloxyethyl)imidazolidin-2-one, N-(2-(meth)acryloyloxyacetamidoethyl)imidazolidin-2-one, and further adhesion promoters known to the person skilled in the art and based on urea or imidazolidin-2-one. Diacetoneacrylamide in combination with a subsequent addition of adipic acid dihydrazide to the dispersion is also suitable for improving the adhesion.

Both bifunctional and polyfunctional monomers may be used as crosslinking monomers. Examples of these are diallyl phthalate, diallyl maleate, triallyl cyanurate, tetraallyloxyethane, divinylbenzene, butanediol 1,4-di(meth)acrylate, triethylene glycol di(meth)acrylate, divinyladipate, allyl(meth)acrylate, vinyl crotonate, methylenebisacrylamide, hexanediol diacrylate, pentaerythrol diacrylate and trimethylolpropane triacrylate.

The copolymers used according to the invention are derived from at least 40% by weight, preferably 50 to 90% by weight, of main monomers of group A). This may be a monomer or a mixture of different monomers of this group.

In addition, the copolymers used according to the invention are derived from 0.1 to 10% by weight, preferably 1 to 6% by weight, particularly preferably 1 to 4% by weight, of monomers of group B). This may be a monomer or a mixture of different monomers of this group.

Furthermore, the copolymers used according to the invention are derived from 1 to 15% by weight, preferably 2 to 10% by weight, of alkoxysilane-containing monomers of group C). This may be a monomer or a mixture of different monomers of this group. The monomers of group C) are optional but their use is preferred. Instead of or in addition to the monomers of group C), it is possible to use amino-, mercapto- or epoxide-functionalized alkoxysilane-containing monomers.

The proportion of the monomers of group D) in the copolymers according to the invention is from 0 to 10% by weight, preferably from 0.5 to 5% by weight, particularly preferably from 0.5 to 3% by weight.

The proportion of the monomers of group E) in the copolymers according to the invention is from 0 to 20% by weight, preferably from 1 to 15% by weight.

The stated amounts of the monomer are based on the total mount of monomers used in the emulsion polymerization and optionally in the subsequent addition. The proportion of the monomers incorporated into the in the form of polymerized units into the copolymer corresponds in general to the added monomers.

Polymer dispersions derived from acrylates, methacrylates and/or vinyl esters of aliphatic carboxylic acids are preferably used.

Preferred monomer mixtures comprising the monomers for the preparation of the poly(meth)acrylates, optionally together with vinyl esters, are vinyl acetate/butyl acrylate, vinyl acetate/dibutyl maleate, vinyl acetate/dibutyl fumarate, vinyl acetate/2-ethylhexyl acrylate, vinyl acetate/ethene/butyl acrylate, vinyl acetate/ethene/dibutyl maleate, vinyl acetate/ethene/dibutyl fumarate, vinyl acetate/ethene/2-ethylhexyl acrylate, methyl methacrylate-/butyl acrylate, methyl methacrylate/styrene/butyl acrylate, methyl methacrylate/2-ethylhexyl acrylate, methyl methacrylate/styrene/2-ethylhexyl acrylate, styrene/butyl acrylate, styrene/2-ethylhexyl acrylate, methyl methacrylate/isobutyl acrylate, methyl methacrylate/isopropyl acrylate.

Further preferred monomer mixtures comprising the monomers for the preparation of polyvinyl esters, optionally together with further functionalized monomers, are vinyl acetate/vinyl chloride/ethene, vinyl acetate/vinyl laurate/ethene, vinyl acetate/vinyl versatate/2-ethylhexyl acrylate, vinyl acetate/vinyl laurate/ethene/vinyl chloride, vinyl acetate/vinyl versatate/ethene/vinyl chloride, vinyl versatate/ethene/vinyl chloride, vinyl acetate/vinyl versatate, vinyl acetate/vinyl versatate/ethene and vinyl acetate/ethene, the combination vinyl acetate/ethene being particularly preferred.

Aqueous plastics dispersion containing
a) a copolymer which is prepared by emulsion polymerization and is derived from
  A) at least 40% by weight, based on the total amount of monomers, of vinyl esters of saturated carboxylic acids, optionally vinylaromatic monomers and/or optionally esters of $\alpha,\beta$-unsaturated carboxylic acids,
  B) from 0.1 to 10% by weight, based on the total amount of monomers, of $\alpha,\beta$-ethylenically unsaturated mono- and/or dicarboxylic acids and/or of $\alpha,\beta$-ethylenically unsaturated sulfonic acids and/or of $\alpha,\beta$-ethylenically unsaturated phosphoric acids and/or of $\alpha,\beta$-ethylenically unsaturated phosphonic acids and/or of amides of $\alpha,\beta$-ethylenically unsaturated mono- and/or dicarboxylic acids,
  C) from 0.5 to 15% by weight, based on the total amount of monomers, of ethylenically unsaturated monomers which have at least one alkoxysilyl group,
  D) optionally up to 10% by weight, based on the total amount of monomers, of an ethylenically unsaturated monomer which contains an anionic and/or nonionic emulsifying group and
  E) optionally up to 20% by weight, based on the total amount of monomers, of other monomers copolymerizable with the monomers of groups A), B), C) and optionally D), with the proviso that, instead of or in addition to the copolymerization of the monomer C), from 0.5 to 15% by weight, based on the total amount of monomers, of a monomer which has at least one amino, mercapto or epoxide group in addition to at least one alkoxysilyl group is added after the emulsion polymerization, and
b) colloidal silica
are novel and are likewise a subject of the present invention.

A polymer dispersion which is prepared by free radical emulsion polymerization and is a homo- or copolymer ("polyacrylate") derived from acrylate and/or methacrylate as the main monomer or a homo- or copolymer ("polyvinyl ester") derived from vinyl esters as the main monomer, preferably a polyacrylate or a polyvinyl ester having a glass transition temperature of from −50 to +50° C., is particularly preferably used as a plastics dispersion in the compositions according to the invention. The glass transition temperature of the polymer can be established by the person skilled in the art by a suitable choice of the monomer combinations.

Apart from the emulsifiers incorporated in the form of polymerized units, the plastics dispersion used according to the invention can additionally be stabilized by protective colloids and/or by emulsifiers. These may already be present during the emulsion polymerization or may be added thereafter.

The protective colloids are polymeric compounds, for example having molecular weights greater than 2000 g/mol, whereas the emulsifiers are low molecular weight compounds whose relative molecular weights are, for example, below 2000 g/mol. These compounds are added during the polymerization itself or can optionally also be subsequently added after the polymerization.

Examples of protective colloids are starch, gum arabic, alginates or tragacanth, methyl-, ethyl-, hydroxyethyl- or carboxymethylcellulose or starch modified by means of saturated acids or epoxides, and synthetic substances, such as polyvinyl alcohol (with or without residual acetyl content) or partly esterified or acetalated polyvinyl alcohol or polyvinyl alcohol etherified with saturated radicals, and polypeptides, such as gelatin, but also polyvinylpyrrolidone, polyvinylmethylacetamide or poly(meth)acrylic acid. Polyvinyl alcohol is preferred.

The proportion by weight of such optionally present protective colloids, based on the total amount of the monomers used, is usually up to 15%.

In many cases, it is advantageous, in the preparation of the dispersions, to use nonionic and/or anionic emulsifiers in addition to the protective colloids or instead of protective colloids.

Suitable nonionic emulsifiers are araliphatic and aliphatic nonionic emulsifiers, such as, for example, ethoxylated mono-, di- and trialkylphenols (degree of ethoxylation: 3 to 50, alkyl radical: $C_4$ to $C_9$), ethoxylates of long-chain alcohols (degree of ethoxylation: 3 to 50, alkyl radical: $C_8$ to $C_{36}$) and polyethylene oxide/polypropylene oxide block copolymers. Ethoxylates of long-chain alkanols (alkyl radical: $C_{10}$ to $C_{22}$, average degree of ethoxylation: 3 to 50) are preferably used and among these those based on native alcohols, Guerbet alcohols or oxo alcohols having a linear or branched $C_{12}$-$C_{18}$-alkyl radical and a degree of ethoxylation of 8 to 50 are particularly preferably used.

Further suitable emulsifiers are described in Houben-Weyl, Methoden der organischen Chemie [Methods of Organic Chemistry], volume XIV/1, Makromolekulare Stoffe [Macromolecular substances], Georg-Thieme-Verlag, Stuttgart, 1961, pages 192-208).

Suitable anionic emulsifiers are alkali metal and ammonium salts of alkyl sulfates (alkyl radical: $C_8$ to $C_{18}$), alkyl phosphonates (alkyl radical: $C_8$ to $C_{18}$), of sulfuric acid monoesters and phosphoric acid mono- and diesters of ethoxylated alkanols (degree of ethoxylation: 2 to 50, alkyl radical: $C_8$ to $C_{22}$) and of ethoxylated alkylphenols (degree of ethoxylation: 3 to 50, alkyl radical: $C_4$ to $C_9$), of alkanesulfonic acids (alkyl radical: $C_{12}$ to $C_{18}$), of alkylarylsulfonic acids (alkyl radical: $C_9$ to $C_{18}$), of sulfosuccinic acid monoesters and sulfosuccinic acid diesters of alkanols (alkyl radical: $C_8$ to $C_{22}$) and ethoxylated alkanols (degree of ethoxylation: 2 to 50, alkyl radical: $C_8$ to $C_{22}$) and nonethoxylated and ethoxylated alkylphenols (degree of ethoxylation: 3 to 50, alkyl radical: $C_4$ to $C_9$). As a rule, the emulsifiers mentioned are used as industrial mixtures, the data on length of alkyl radical and EO chain being based on the respective maximum of the distributions occurring in the mixtures. Examples from said emulsifier classes are ®Texapon K12 (sodium laurylsulfate from Cognis), ®Emulsogen EP ($C_{13}$-$C_{17}$-alkanesulfonate from Clariant), ®Maranil A 25 IS (sodium n-alkyl-($C_{10}$-$C_{13}$)benzenesulfonate from Cognis), ®Genapol liquid ZRO (sodium $C_{12}/C_{14}$-alkyl ether sulfate having 3 EO units from Clariant), ®Hostapal BVQ-4 (sodium salt of a nonylphenol ether sulfate having 4 EO units from Clariant), Aerosol MA 80 (sodium dihexylsulfosuccinate from Cytec Industries), Aerosol A-268 (disodium isodecylsulfosuccinate from Cytec Industries) and Aerosol A-103 (disodium salt of a monoester of sulfosuccinic acid with an ethoxylated nonylphenol from Cytec Industries).

The amounts of the optionally used emulsifiers are within the limits customarily to be maintained. Altogether, up to about 10% by weight, preferably from 0.1 to 5% by weight, based on the total amount of the monomers used for the preparation of the dispersions, are therefore used. As a rule, mixtures of anionic and nonionic emulsifiers are therefore used but it is also possible to use anionic and nonionic emulsifiers alone for additional stabilization of the dispersions.

The aqueous plastics dispersions used according to the invention typically have solids contents of from 20 to 70% by weight, preferably from 30 to 65% by weight and particularly preferably from 40 to 60% by weight.

The polymer dispersions used according to the invention optionally contain even further additives customary per se.

Additives and further constituents which may be used are film formation auxiliaries, such as mineral spirit, Texanol®, TxiB®, butylglycol, butyldiglycol, butyldipropylene glycol and butyltripropylene glycol; plasticizers, such as dimethyl phthalate, diisobutyl phthalate, diisobutyl adipate, Coasol B® and Plastilit 3060®; wetting agents, such as AMP 90®, TegoWet 280®, Fluowet PE®; thickeners, such as polyacrylates or polyurethanes, such as Borchigel L75® and Tafigel PUR 60®; antifoams, e.g. mineral oil or silicone antifoams; UV screening agents, such as Tinuvin 1130®, subsequently added stabilizing emulsifiers or polymers, such as polyvinyl alcohol or cellulose ether, rheology-modifying auxiliaries, e.g. polyacrylate or polyurethane thickeners, and other additives and auxiliaries as are customary for the formulation of plasters, renders and paints.

The polymer dispersion used according to the invention is prepared by free radical emulsion polymerization. Any expedient and properly chosen technique is suitable for carrying out the emulsion polymerization. Examples of emulsion polymerization methods include a batch process in which a polymerization reactor is charged with water, a surfactant serving as an emulsifier and a monomeric component. For starting the polymerization, the temperature of the mixture is increased and suitable additives, such as a polymerization initiator, are added to the mixture. In the monomer metering process, water and emulsifier are fed to the polymerization reactor. The temperature of the mixture is increased, and a monomeric component is added dropwise to the mixture. In the monomer emulsion metering process, the monomeric component is first emulsified with a surfactant serving as an emulsifier and with water before the dropwise addition of the monomer, and the resulting emulsion is then added dropwise to the mixture.

The emulsion polymerization can therefore be carried out by the batch process, by the feed process, by the combined batch/feed process or by the continuous process. In addition to the preparation of single-phase emulsion polymers, the preparation of multiphase emulsion polymers is also possible. This is effected by polymerization of a plurality of different monomer combinations, preferably two different monomer combinations, in successive stages. However, single-phase emulsion polymers are preferably used.

For example, the following are used as free radical initiators: hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3, 5,5-trimethyl)hexanoyl peroxide, tert-butyl perpivalate, hydroperoxypinane, p-methane hydroperoxide. The above-mentioned compounds can also be used within a redox systems, transition metal salts, such as iron(II) salts, or other reducing agents being concomitantly used. Alkali metal salts of oxymethanesulfinic acid, mercaptans of chain length $C_{10}$-$C_{14}$, but-1-en-3-ol, hydroxylamine salts, sodium dialkyldithiocarbamate, sodium bisulfite, ammonium bisulfite, sodium dithionite, diisopropyl xanthogen disulfide, ascorbic acid, tartaric acid, isoascorbic acid, boric acid, urea and formic acid can be concomitantly used as reducing agents or regulators.

However, water-soluble persulfates, in particular ammonium persulfate or sodium persulfate, are preferably used for initiating polymerization.

Any chain-transfer reagents properly chosen from among the known substances can likewise preferably be used. Examples of these are, inter alia, alcohols, such as methanol, ethanol, propanol and butenol, aldehydes and ketones, such as acetone, methyl ethyl ketone, cyclohexane, acetophenone, acetaldehyde, propionaldehyde, n-butylaldehyde, furfural and benzaldehyde, and mercaptans, such as dodecyl mercaptan, lauryl mercaptan, normal mercaptan, thioglycolic acid, octyl thioglycolate and thioglycerol. Such chain-transfer reagents can be used alone or in the form of a combination of two or more thereof.

Any expediently and properly chosen aqueous medium can be used for the emulsion polymerization. Examples of aqueous media include water and aqueous alcoholic solutions. With regard to performance characteristics and costs, water is preferred. Water of all kinds, for example tap water or ion exchanger water, is suitable.

Protective colloid and/or emulsifier used for stabilization can likewise either be initially introduced completely at the beginning of the polymerization or partly initially introduced and partly metered or completely metered during the polymerization. The polymerization temperature is typically in the range from 20 to 120° C., preferably in the range from 30 to 110° C. and very particularly preferably in the range from 45 to 95° C.

After the end of the polymerization, a further, preferably chemical aftertreatment, in particular with redox catalysts, such as, for example, combinations of the abovementioned oxidizing agents and reducing agents, can follow for demonomerization. Furthermore, residual monomer present can be removed in a known manner, for example by physical demonomerization, i.e. removed by distillation (in particular via steam distillation) or by stripping with an inert gas. A combination of physical and chemical methods which permits a reduction of the residual monomers to very low contents (<1000 ppm, preferably <100 ppm) is particularly efficient.

The compositions according to the invention can be prepared without problems by simple mixing of the intended amounts of the individual components by means of a conventional stirrer or the like. In the case of the compositions according to the invention, the plastics dispersion, which contains an acid group and an alkoxysilyl group and has various outstanding physical properties, is combined with the colloidal silica. The compositions are therefore characterized by stable physical properties and excellent performance characteristics.

The compositions according to the invention can be used in the construction sector, namely as plasters and renders or as paints. These compositions are particularly preferably used as plasters, renders, facade paints and roofing tile paints. The present invention also relates to these uses.

Particularly preferred plasters, renders and paints according to the invention are stabilized with the use of nonionic emulsifiers as dispersants, for example with the products Surfynol 104H, Additiol VXW 6208, Nusoperse 2006 and Nusoperse 2008.

The present invention furthermore relates to the use of plastics dispersions containing an aqueous polymer dispersion prepared by free radical emulsion polymerization and derived from the above-described monomers A), B), C), D) and optionally E) and colloidal silica in plasters and renders or in paints.

The following examples serve for illustrating the invention. The parts and percentages stated in the examples are based on weight, unless noted otherwise.

EXAMPLES 1 TO 5

Working method for the preparation of the copolymer dispersion according to Example 1 which can be used according to the invention A mixture according to Table 1 was initially introduced into a 2.5 liter reactor equipped with anchor stirrer and condenser and was heated to 80° C. Thereafter, 5% of the monomer dispersion described in Table 1 were added as rapidly as possible and immediately thereafter a solution of 0.38 g of potassium peroxodisulfate in 18 g of water was added. After polymerization for 15 minutes, the remainder of the monomer emulsion and a solution of 1.54 g of potassium peroxodisulfate in 72 g of water were added separately in the course of 4 hours, the temperature being kept at 80° C. 30 minutes after the end of the addition, 9.36 of a 12.5% strength aqueous ammonia solution were introduced into the reactor and the temperature was kept at 80° C. for a further hour. Thereafter, the batch was cooled to room temperature and 1047.46 g of a colloidal silica dispersion (solids content: 41%; particle size: 25 nm, pH: 9.9) were added to the batch in the course of 30 minutes.

The dispersions of Examples 2 to 5 were prepared analogously to the above working method. Details of the experimental procedure are shown in Table 1 below. In the case of Comparative Examples 2 and 4, no colloidal silica was added. Table 2 shows some properties of the dispersions obtained.

TABLE 1

Composition of the polymer dispersions prepared

|  | Example 1 | Example 2 | Example 3 | Example 4 | Example 5 |
|---|---|---|---|---|---|
| Initially introduced mixture |  |  |  |  |  |
| Water (g) | 308 | 308 | 308 | 308 | 308 |
| Emulsifier D)[1] (g) | 25.3 | 25.3 | 0.6 | 0.6 | 0.6 |
| Monomer emulsion |  |  |  |  |  |
| Water (g) | 299 | 408 | 299 | 324 | 341.7 |
| Emulsifier D)[1] (g) | 13.1 | 13.1 | 37.7 | 37.7 | 37.7 |
| Methacrylic acid (g) | 18.9 | 18.9 | 18.9 | 18.9 | 18.9 |
| Methyl methacrylate (g) | 295.8 | 295.8 | 295.8 | 295.8 | 295.8 |
| Butyl acrylate (g) | 304.2 | 304.2 | 304.2 | 304.2 | 304.2 |
| Vinyltriethoxysilane (g) | 13.1 | 13.1 | 13.1 | 13.1 | 13.1 |
| Subsequent addition |  |  |  |  |  |
| Colloidal silica (g) | 1047.5 | — | 1030 | — | 515 |
| Water (g) | — | — | — | 78 | — |

[1]Poly(oxy-1,2-ethanediyl)-alpha-sulfo-omega-[4-nonyl-2-(1-propenyl)-phenoxy] (branched) ammonium salt

TABLE 2

Physical properties of the polymer dispersions prepared

| Example No. | Solids content (%) | Brookfield viscosity mPas (23° C., 20 rpm) | pH | Particle size (nm)[2] |
|---|---|---|---|---|
| 1 | 45.2 | 1290 | 8.4 | 108 |
| 2 | 45.0 | 9200 | 7.8 | 78 |
| 3 | 45.0 | 80 | 8.5 | 139 |
| 4 | 44.7 | 370 | 8.4 | 126 |
| 5 | 44.9 | 100 | 8.4 | 151 |

[2]Mean particle diameter (weight average) determined by dynamic light scattering With the dispersions of Examples 1 and 2, paints were prepared according to the following formulation (pbw=parts by weight):

```
242  pbw of water
242  pbw of 1,2-propylene glycol
 52  pbw of Dispex GA 40 (commercial product of Ciba Speciality
     Chemicals; dispersant containing ammonium salt of an
     acrylic acid copolymer)
 10  pbw of AMP 90 (2-amino-2-methyl-1-propanol)
 20  pbw of antifoam BYK 022
 20  pbw of biocide Mergal K7
``` were mixed, 740 pbw of titanium dioxide Kronos 2190 were introduced with stirring and dispersing was then effected with a dissolver at a circumferential speed of at least 14 m/s on the toothed disk for 20 minutes. After cooling of the pigment trituration,

```
185  pbw of binder (dispersion)
 33  pbw of pigment trituration were mixed with stirring.
```

During the further stirring at a moderate stirring speed,

| | |
|---|---|
| 1.5 pbw of ammonia (25% strength) | |
| 15.3 pbw of 1,2-propylene glycol | |
| 3.7 pbw of Texanol (commercial product from Eastman Chemicals; solvent containing 2,2,2-trimethyl-1,3-pentanediol monoisobutyrate) and, at the end, the thickener mixture | |
| 8.3 pbw of Mowilith LDM 7002 (about 18% strength in water) were added. | |

With the dispersions of Examples 1 and 2, plasters and renders were prepared according to the formulation stated in Table 3 (pbw=parts by weight):

TABLE 3

Plaster or render

| Constituents | Parts by weight |
|---|---|
| Water | 53.5 |
| Thickener (polyacrylate) | 1.5 |
| Mowiplus XW 330, dispersant | 3.0 |
| Calgon N, 10%, wetting agent | 6.0 |
| Sodium hydroxide solution, 10% | 2.0 |
| Agitan, antifoam | 2.0 |
| Dispersion[3] | 140.0 |
| Titanium dioxide Kronos 2160 | 20.0 |
| China clay B | 20.0 |
| Calcium carbonate, Omyacarb 40 GU | 150.0 |
| Calcium carbonate, Omyacarb 130 GU | 170.0 |
| Calcilite 0.1-0.5 | 100.0 |
| Calcilite 1.5-2.0 | 300.0 |
| Mineral spirit | 4.0 |
| Butyldiglycol acetate | 6.0 |
| Polyethylene | 2.0 |

[3] according to Examples 1 and 2

The components listed in Table 3 were processed in a stirred vessel to give a plaster or render.
Investigations of Performance Characteristics
Blocking Resistance For testing the blocking resistance, hiding power cards from BYK Malinckrodt or from Morest were coated with a coating having a wet thickness of 50 µm. After drying for 24 hours, two coated cards were placed with their coated side one on top of the other and loaded for 2 hours at room temperature with $3.1 \cdot 10^4$ N/m². The force required for separating the cards from one another again was then determined.
Crosshatch Test Glass plates were coated with a film having a wet thickness of 200 µm and dried at 23° C. for 24 hours at 50% relative humidity. The crosshatch test was effected according to DIN 51151.
Blister Test The paints were applied with good coverage to a glass plate using a painter's roller. After a drying time of 24 hours, a second paint coat was applied in the same way. The size of the paint coat area was 20×20 cm. After the second paint coat had been dried for 24 hours, the glass plates were placed in a water bath (blister bath) with the coated side facing downward. The temperature of the water bath was 50° C. The distance from the water surface to the test plate was 15 cm and the test plates covered the water bath over the whole area. After loading for 8 hours, the test plates were removed from the blister bath and placed perpendicularly at room temperature for drying. The drying time was at least 2 hours. The evaluation was effected visually on the dried sample. Adhesion and blister formation were assessed.

Determination of the Tendency to Soiling with Dirt Suspensions

The paint to be investigated was applied with a box knife coater (300 µm) to 300×150×4 mm Eterplan fiber cement boards. The plaster or render to be investigated was applied to the Eterplan boards and dried for 24 hours at room temperature.

The test medium used was a dirt suspension comprising 17% of gas black, 70% of Japanese standard dust No. 8 and 13% of special pitch No. 5 (from Worlee). The triturated standard dirt powder (1.0 g) was stirred in butylglycol (1.0 g) and suspended in 998.0 g of water.

The test panels were set up on a surface at angle of 60°. 500 ml of the dirt suspension were dripped uniformly over the test panels in a circulation by means of a pump for 30 minutes. Drying was then effected for 24 hours at 50° C. The L value was then determined according to DIN 5033. This cycle was repeated five times and each time the L value was determined. A fresh dirt suspension was used for each new cycle. In the determination of the L value, the measurement was carried out at four points of the surface and the mean value was determined therefrom. The L value difference was determined per cycle (L value, white=at the beginning of the cycle; L value, black=at the end of the cycle).

Results of the Testing of the Performance Characteristics
Tendency to Soiling

In the determination of the tendency to soiling with dirt suspensions, a plaster or render containing the dispersion of Example 1 showed a difference of the L values (white-black) of 9.8. In contrast, a plaster or render containing the dispersion of Comparative Example 2 had a difference of the L values (white-black) of 16.2.

After weathering of the samples in the open air for 3 months, a plaster or render containing the dispersion of Example 1 showed a difference of the L values of 2.5. In contrast, a plaster or render weathered in the open air and containing the dispersion of Comparative Example 2 had a difference of the L values of 3.5.

After weathering of the samples in the open air for 6 months, a plaster or render containing the dispersion of Example 1 showed a difference of the L values of 3.9. In contrast, a plaster or render weathered in the open air and containing the dispersion of Comparative Example 2 had a difference of the L values of 5.5.

Crosshatch

In the crosshatch test, a paint containing the dispersion of Example 1 showed no fragmented cut edges (classification 0). In contrast, a paint containing the dispersion of Comparative Example 2 showed fragments in the case of 15-35% of the cut edges (classification 3).

Blocking Resistance

In the blocking resistance test, a paint containing the dispersion of Example 1 showed a blocking resistance of 40 g/6.25 cm². In contrast, a paint containing the dispersion of Comparative Example 2 showed a blocking resistance of 1300 g/6.25 cm².

Blister Test

In the blister test, a paint containing the dispersion of Example 1 showed no blister formation and adhered well. In contrast, a paint containing the dispersion of Comparative Example 2 showed pronounced blister formation and only unsatisfactory adhesion.

EXAMPLES 6 TO 8

A paste was first prepared according to the formulation in the table below.

| Constituents | Parts by weight |
|---|---|
| Water | 140.0 |
| Thickener (Tylose) | 2.0 |
| Agitan 281 | 4.0 |
| Dispersant, Lopon 895 | 4.0 |
| Calgon N, 10% | 5.0 |
| Titanium dioxide Kronos 2160 | 200.0 |
| Calcium carbonate, Omyacarb 5 GU | 210.0 |
| Micro talc AT1 | 40.0 |
| China clay B | 20.0 |
| Ammonia, concentrated | 2.0 |
| Butyldiglycol acetate | 17.0 |
| Tafigel PUR 40 1:9 in water | 6.0 |

For the preparation of example paints 6, 7 and 8, in each case 65 parts of the paste were stirred together with 35 parts of the dispersion as follows until a homogeneous paint had formed:

EXAMPLE 6

65 parts of paste and 35 parts of dispersion according to Example 3.

COMPARATIVE EXAMPLE 7

65 parts of paste and 35 parts of dispersion according to Example 4.

EXAMPLE 8

65 parts of paste and 35 parts of dispersion according to Example 5.

Figure 2:
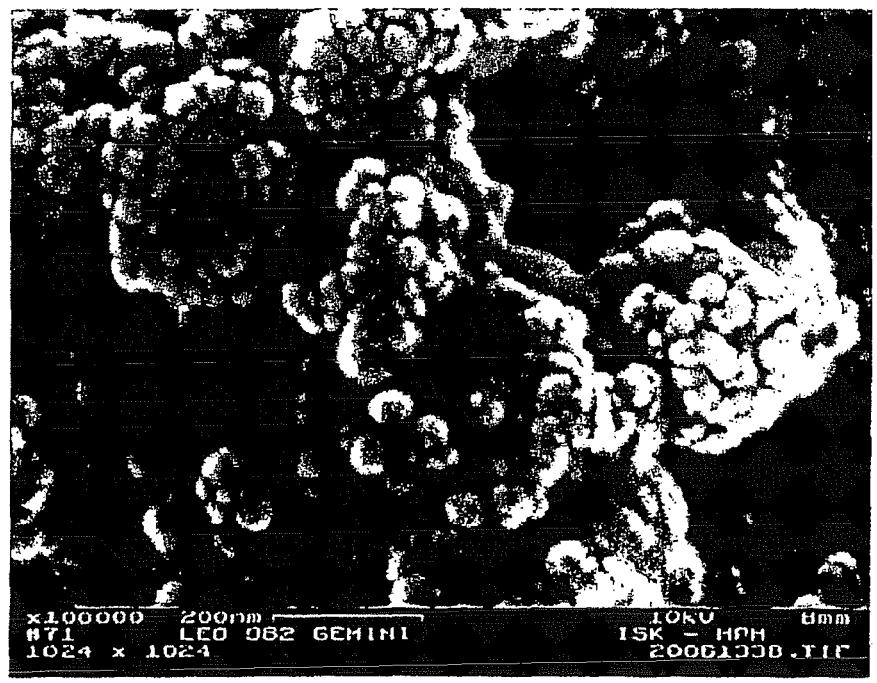
Figure 3:

FIGS. 1 to 3 show scanning electron micrographs of surfaces of coats of the paints containing the dispersion of Example 6 (FIG. 1), the dispersion of Example 8 (FIG. 2) and the dispersion of Example 7 (FIG. 3).

The samples for the scanning electron micrographs were prepared as follows: the paints were applied to microscope slides and dried at room temperature. The surfaces were then examined under a scanning electron microscope with 100 000 times magnification. The paints according to the invention show a substantial nanostructure on the paint surface (FIGS. 1 and 2) which differ substantially from comparative paint (FIG. 3).

EXAMPLES 9 AND 10

Preparation of a Vinyl Acetate/Ethylene Copolymer Dispersion with and without Colloidal Silica An aqueous solution consisting of the following constituents was introduced into a pressure apparatus having a stirrer, jacket heating and metering pumps:

22 000 g of water, 86 g of sodium acetate, 1440 g of a 70% strength by weight aqueous solution of an oxoalkyl ethoxylate with 28 mol of ethylene oxide, 2160 g of a 10% strength by weight aqueous polyvinyl alcohol solution (viscosity of the 4% strength by weight aqueous solution 18 mPa·s), 1127 g of a 15% strength by weight sodium laurylsulfate solution, 577 g of a 30% strength by weight aqueous sodium vinylsulfonate solution and 8 g of a 1% strength by weight aqueous solution of $Fe(II)SO_4.7H_2O$. The pH of the solution was 7.2. The apparatus was freed from atmospheric oxygen, and ethylene was forced into the apparatus. At an ethylene pressure of 20 bar, 1500 g of vinyl acetate were metered in. Heating was effected to an internal temperature of 60° C. and the ethylene pressure was increased to 40 bar during this procedure. 10% of a solution of 27.1 g of Brüggolit C in 2000 g of water were now metered. Thereafter, 10% of a solution of 27.1 g of tert-butyl hydroperoxide in 2000 g of water were metered in at an internal temperature of 60° C. and cooling was effected for removing the heat of reaction. A mixture of 28 800 g of vinyl acetate and 70 g of vinyltrimethoxysilane (VTM) and the remaining 90% of the reduction and initiator solution were then metered in, the ethylene pressure being kept at 40 bar, until 4135 g of ethylene were in the reactor. Thereafter, a solution of 36 g of sodium persulfate in 600 g of water was metered in and the internal temperature was increased to 80° C. and this temperature was maintained for 1 hour. Thereafter, the major part of the unreacted ethylene was removed in gaseous form with stirring, and 2 l of water were added. 2 l of water were then distilled off in the course of 2 hours with application of a vacuum, with the result that the residual vinyl acetate content of the dispersion was reduced to 0.05% by weight, based on the dispersion. By repeating the separation process, a residual vinyl acetate content of 0.012% by weight was achieved. The batch was then cooled to room temperature. A dispersion of a copolymer which had 12% by weight of units derived from ethylene, 0.5% by weight of units derived from sodium vinylsulfonate, 0.2% by weight of units derived from vinyltrimethoxysilane was obtained. The content of polyvinyl alcohol was 0.6% by weight, based on the solids content; the content of oxoalkyl ethoxylate was 3% by weight, based on the solids content. The solids content of the dispersion was 54%. For the preparation of Comparative Example 9, the dispersion was diluted with 1896 g of water. The solids content was 51%.

For the preparation of Example 10 according to the invention, 8752 g of a colloidal silica dispersion (solids content: 40%) were added to the dispersion in the course of 30 minutes. The solids content was 51%.

For testing the blocking resistance, glass microscope slides were coated with a coat having a wet thickness of 300 μm. After drying for 24 hours, two coated microscope slides were placed with their coated side one on top of the other and loaded with their own weight for 2 hours at room temperature. The force required to separate the microscope slides from one another again was then determined.

For Comparative Example 9, a blocking resistance of 2444 g/6.25 cm$^2$ was determined. The example according to the invention showed a substantially better blocking resistance of 609 g/6.25 cm$^2$.

The invention claimed is:
1. A composition containing
   a) mineral filler, the proportion of particles having a diameter of at least 40 μm being at least 40% by weight, wherein the mineral filler is present in an amount of from 50 to 80% by weight, based on the total formulation,
   b) pigment,
   c) colloidal silica and
   d) aqueous plastics dispersion which contains a copolymer which is prepared by emulsion polymerization and is derived from
      A) at least 40% by weight, based on the total amount of monomer, of esters of α,β-unsaturated carboxylic acids, vinyl esters of saturated carboxylic acids, vinylaromatic monomers or combinations of two or more of these monomers,

B) from 0.1 to 10% by weight, based on the total amount of monomers, of α,β-ethylenically unsaturated mono- and/or dicarboxylic acids and/or of α,β-ethylenically unsaturated sulfonic acids and/or of α,β-ethylenically unsaturated phosphoric acids and/or of α,β-ethylenically unsaturated phosphonic acids and/or of amides of α,β-ethylenically unsaturated mono- and/or dicarboxylic acids, C) from 0.5 to 15% by weight, based on the total amount of monomers, of ethylenically unsaturated monomers which have at least one alkoxysilyl group, D) from 0.1 to 10% by weight, based on the total amount of monomers, of an ethylenically unsaturated surface-active monomer containing at least one anionic and/or nonionic emulsifying group and E) optionally up to 20% by weight, based on the total amount of monomers, of other monomers copolymerizable with the monomers of groups A), B), C) and D), with the proviso that, instead of or in addition to the copolymerization of the monomer C), from 0.5 to 15% by weight, based on the total amount of monomers, of a monomer which has at least one amino, mercapto or epoxide group in addition to at least one alkoxysilyl group is added after the emulsion polymerization.

2. The composition as claimed in claim 1, which additionally contains e) water-soluble silicate and/or f) silicone resin.

3. The composition as claimed in claim 1, wherein the colloidal silica c) has a mean diameter of from 2 to 100 nm and is present in an amount of from 5 to 200% by weight, based on the amount of the copolymer.

4. The composition as claimed in claim 2, wherein the water-soluble silicate is alkali waterglass.

5. The composition as claimed in claim 1, which contains colloidal silica c) added after the emulsion polymerization.

6. The composition as claimed in claim 1, wherein the mineral filler a) is calcium carbonate, quartz and/or a silicate filler.

7. The composition as claimed in claim 1, wherein the pigment b) is titanium dioxide, iron oxide, zinc oxide and/or a phthalocyanine pigment and is present in an amount of from 1 to 50% by weight, based on the total formulation.

8. The composition as claimed in claim 2, wherein the silicone resin is a polydimethylsiloxane.

9. The composition as claimed in claim 1, wherein component A) is an acrylate and/or a methacrylate, optionally in combination with styrene.

10. The composition as claimed in claim 1, wherein component A) is a vinyl ester of a saturated carboxylic acid having one to four carbon atoms.

11. The composition as claimed in claim 1, wherein component B) is acrylic acid, methacrylic acid or vinylsulfonic acid.

12. The composition as claimed in claim 1, wherein component C) is vinyltrialkoxysilane.

13. The composition as claimed in claim 1, wherein component D) is derived from compounds of the formulae X, XI, XII, XIII, XIV, XV, XVI, XVII, XVIII, XIX, XX, XXI, XXII, XXIII, XXIV, XXV, XXVI, XXVII, XXVIII, XXIX, XXX, XXXI, XXVII and XXXIII

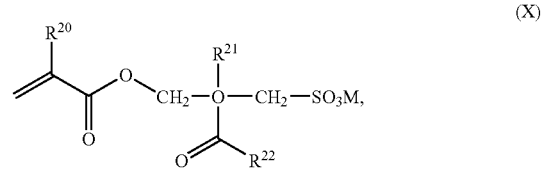
(X)

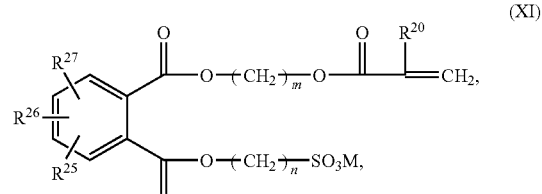
(XI)

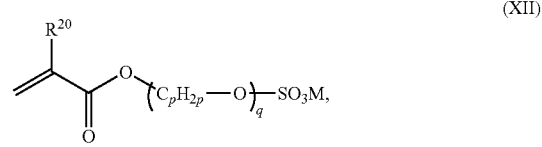
(XII)

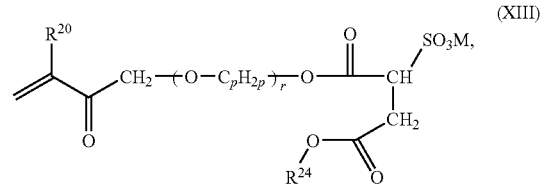
(XIII)

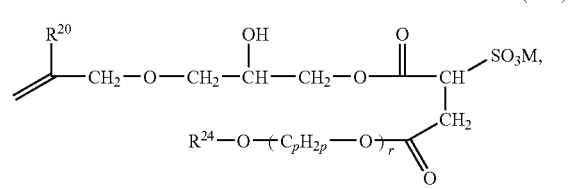
(XIV)

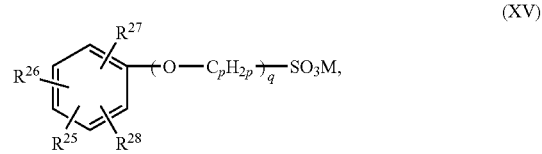
(XV)

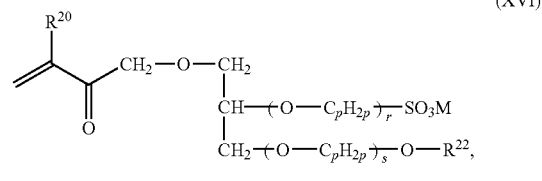
(XVI)

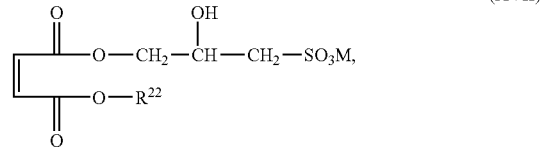
(XVII)

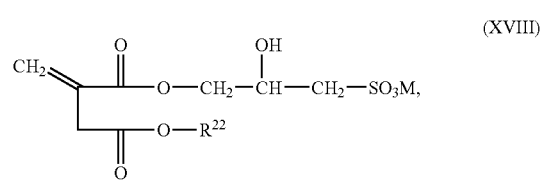
(XVIII)

-continued

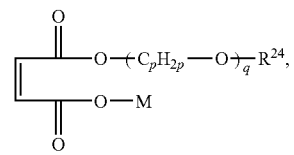
(XIX)

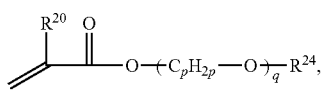
(XX)

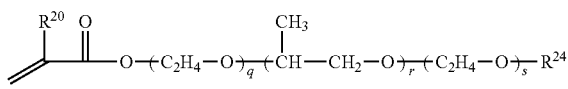
(XXI)

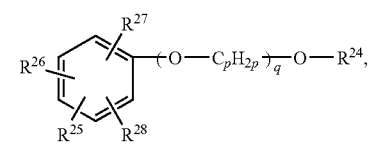
(XXII)

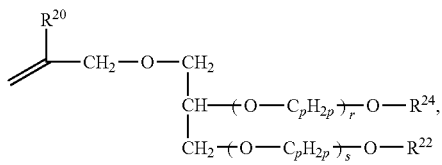
(XXIII)

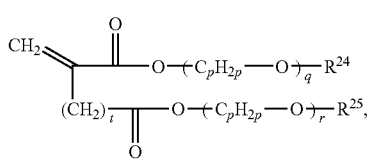
(XXIV)

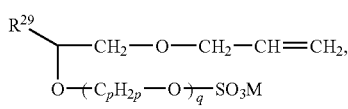
(XXV)

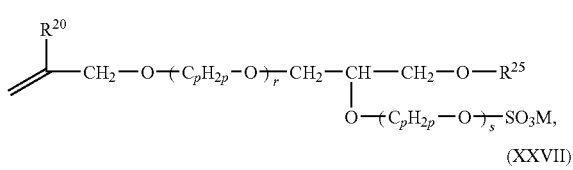
(XXVI)

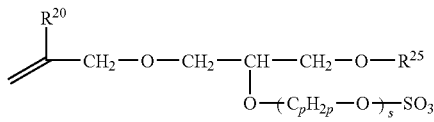
(XXVII)

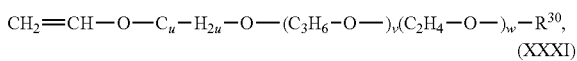
(XXVIII)

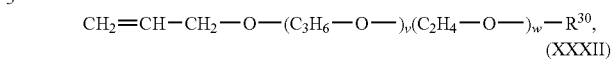
(XXIX)

-continued

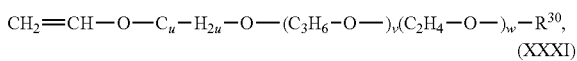
(XXX)

$CH_2=CH-O-C_uH_{2u}-O-(C_3H_6-O-)_v(C_2H_4-O-)_w-R^{30}$, (XXXI)

$CH_2=CH-CH_2-O-(C_3H_6-O-)_v(C_2H_4-O-)_w-R^{30}$, (XXXII)

$CH_2=CH-CH_2-O-(C_3H_6-O-)_v(C_2H_4-O-)_w-SO_3M$, (XXXIII)

$[R^{31}-O-(C_3H_6-O-)_v(C_2H_4-O-)_w]_t-R^{32}$, in which $R^{20}$ and $R^{21}$, independently of one another, are hydrogen or $C_1$-$C_4$-alkyl,
$R^{22}$ is $C_6$-$C_{30}$-alkyl, $C_6$-$C_{30}$-alkenyl or $C_7$-$C_{30}$-alkylaryl,
M is an alkali metal cation, an ammonium ion or hydrogen,
$R^{25}$, $R^{26}$ and $R^{27}$, independently of one another, are hydrogen, $C_1$-$C_{30}$-alkyl, $C_2$-$C_{30}$-alkenyl, cycloalkyl, aryl or acyl,
n and m, independently of one another, are integers from 1 to 4,
p is an integer from 2 to 4,
q is an integer from 1 to 100,
$R^{24}$ is hydrogen, $C_1$-$C_{30}$-alkyl, $C_2$-$C_{30}$-alkenyl, cycloalkyl, aryl or acyl,
r is an integer from 0 to 100,
$R^{28}$ is $C_2$-$C_4$-alkenyl,
s is an integer from 0 to 100,
t is 1 or 2,
$R^{29}$ is $C_1$-$C_{30}$-alkyl,
u is an integer from 1 to 20,
v and w, independently of one another, are integers from 0 to 100, at least one of the numbers v or w not being equal to zero,
$R^{30}$ is hydrogen or $C_1$-$C_4$-alkyl,
$R^{31}$ is an alkenyl radical or a carboxyalkenyl radical having 6 to 30 carbon atoms and
$R^{32}$ is hydrogen, $C_1$-$C_4$-alkyl or a radical of the formula $PO_{4-t}M_{3-t}$.

14. The composition as claimed in claim 13, wherein component D) is derived from compounds of the formula XVa

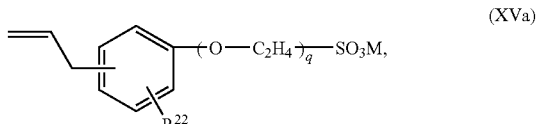
(XVa)

in which q, $R^{22}$ and M has the meaning defined in claim 13.

15. The composition as claimed in claim 1, which contains at least one nonionic emulsifier.

16. A composition containing
a) mineral filler, the mean diameter of the particles being from 1 to 40 μm, wherein the mineral filler is present in an amount of from 20 to 60% by weight, based on the total formulation,
b) pigment,
c) colloidal silica and
d) aqueous plastics dispersion which contains a copolymer which is prepared by emulsion polymerization and is derived from
A) at least 40% by weight, based on the total amount of monomer, of esters of α,β-unsaturated carboxylic acids, vinyl esters of saturated carboxylic acids, vinylaromatic monomers or combinations of two or more of these monomers, B) from 0.1 to 10% by weight, based on the total amount of monomers, of α,β-ethylenically unsaturated mono- and/or dicarboxylic acids and/or of α,β-ethylenically unsaturated sulfonic acids and/or of α,β-ethylenically unsaturated phosphoric acids and/or of α,β-ethylenically unsaturated phosphonic acids and/or of amides of α,β-ethylenically unsaturated mono- and/or dicarboxylic acids, C) from 0.5 to 15% by weight, based on the total amount of monomers, of ethylenically unsaturated monomers which have at least one alkoxysilyl group, D) from 0.1 to 10% by weight, based on the total amount of monomers, of an ethylenically unsaturated surface-active monomer containing at least one anionic and/or nonionic emulsifying group and E) optionally up to 20% by weight, based on the total amount of monomers, of other monomers copolymerizable with the monomers of groups A), B), C) and D), with the proviso that, instead of or in addition to the copolymerization of the monomer C), from 0.5 to 15% by weight, based on the total amount of monomers, of a monomer which has at least one amino, mercapto or epoxide group in addition to at least one alkoxysilyl group is added after the emulsion polymerization.

* * * * *